United States Patent
Wheelwright et al.

(10) Patent No.: US 12,468,997 B2
(45) Date of Patent: Nov. 11, 2025

(54) SYSTEM AND METHOD FOR GENERATING AN ACTION STRATEGY

(71) Applicant: PLAIP, LLC., Tempe, AZ (US)

(72) Inventors: Tom Wheelwright, Tempe, AZ (US); Ryan Husk, Tempe, AZ (US)

(*) Notice: Subject to any disclaimer, the term of this patent is extended or adjusted under 35 U.S.C. 154(b) by 0 days.

(21) Appl. No.: 18/110,469

(22) Filed: Feb. 16, 2023

(65) Prior Publication Data

US 2024/0281741 A1    Aug. 22, 2024

(51) Int. Cl.
| | |
|---|---|
| G06Q 10/063 | (2023.01) |
| G06F 18/243 | (2023.01) |
| G06F 18/2431 | (2023.01) |
| G06Q 10/0637 | (2023.01) |

(52) U.S. Cl.
CPC ..... *G06Q 10/0637* (2013.01); *G06F 18/2431* (2023.01)

(58) Field of Classification Search
None
See application file for complete search history.

(56) References Cited

U.S. PATENT DOCUMENTS

| | | | | |
|---|---|---|---|---|
| 2002/0156632 | A1* | 10/2002 | Haynes | G09B 17/003 704/270 |
| 2012/0136804 | A1  | 5/2012  | Lucia, Sr. | |
| 2016/0110813 | A1* | 4/2016  | Hayden | G06Q 40/06 705/36 R |
| 2018/0130156 | A1* | 5/2018  | Grau | G06Q 50/2057 |
| 2018/0253676 | A1* | 9/2018  | Sheth | G06Q 10/06393 |
| 2019/0320038 | A1* | 10/2019 | Walsh | G06F 9/546 |
| 2020/0167524 | A1* | 5/2020  | Hunter | G06F 40/253 |
| 2020/0234373 | A1  | 7/2020  | Graver | |
| 2020/0320894 | A1* | 10/2020 | Davidson | G06N 3/006 |
| 2021/0089934 | A1* | 3/2021  | Thornley | G06F 40/35 |
| 2021/0134170 | A1* | 5/2021  | Schultz | A63F 13/67 |
| 2021/0312390 | A1* | 10/2021 | Sanidas | G06Q 10/10 |
| 2022/0028003 | A1  | 1/2022  | Evans | |
| 2022/0086393 | A1* | 3/2022  | Peters | H04N 7/147 |
| 2022/0092515 | A1* | 3/2022  | Kasabach | G06Q 10/063112 |
| 2022/0198562 | A1* | 6/2022  | Cella | G06Q 40/04 |

(Continued)

FOREIGN PATENT DOCUMENTS

CN    111527467 B  *  8/2024  ............. G06F 18/29

OTHER PUBLICATIONS

M. S. Bin Othman, S. L. Keoh and G. Tan, "Efficient journey planning and congestion prediction through deep learning," 2017 International Smart Cities Conference (ISC2), Wuxi, China, 2017 (Year: 2017).*

*Primary Examiner* — Jerry O'Connor
*Assistant Examiner* — Philip N Warner
(74) *Attorney, Agent, or Firm* — Caldwell Intellectual Property Law

(57) ABSTRACT

A system for generating an action strategy is disclosed. The system includes at least a processor. The system includes a memory communicatively connected to the processor, the memory containing instructions configuring the at least a processor to receive composition data from a user, classify the composition data to one or more composition groups, provide a composition course as a function of the one or more composition groups, determine an action item as a function of the one or more composition groups, and generate an action strategy as a function of the action item.

18 Claims, 6 Drawing Sheets

(56) References Cited

U.S. PATENT DOCUMENTS

| | | | |
|---|---|---|---|
| 2022/0237614 A1* | 7/2022 | Lin | G06N 5/04 |
| 2022/0237700 A1* | 7/2022 | Sreenivasan | G06F 3/0488 |
| 2022/0246056 A1* | 8/2022 | Kodadek, III | G09B 5/02 |
| 2022/0358376 A1* | 11/2022 | De Silva | G06Q 10/10 |
| 2023/0237582 A1* | 7/2023 | Probetts | G06Q 40/06 |
| | | | 705/36 R |
| 2023/0282358 A1* | 9/2023 | Shah | G16H 40/20 |
| | | | 705/3 |
| 2023/0376903 A1* | 11/2023 | Dumont | G06Q 10/06313 |
| 2023/0419397 A1* | 12/2023 | Kushner | G06Q 50/186 |
| 2024/0242619 A1* | 7/2024 | Bowler | G09B 5/02 |

* cited by examiner

SYSTEM AND METHOD FOR GENERATING AN ACTION STRATEGY

FIELD OF THE INVENTION

The present invention generally relates to the field of strategy generation. In particular, the present invention is directed to a system and method for generating an action strategy.

BACKGROUND

Formulating a strategy helps understand strengths and weaknesses. With a strategy, one can analyze what one is good at and improve on one's weaker aspects. A strategy ensures that every aspect of one's life is planned. This means more efficiency and more effective plans. Existing solutions to generating strategy efficiently is not sufficient.

SUMMARY OF THE DISCLOSURE

In an aspect, a system for generating an action strategy is disclosed. The system includes at least a processor. The system includes a memory communicatively connected to the processor, the memory containing instructions configuring the at least a processor to receive composition data from a user, classify the composition data to one or more composition groups, provide a composition course as a function of the one or more composition groups, determine an action item as a function of the one or more composition groups, and generate an action strategy as a function of the action item.

In another aspect, a method for generating an action strategy. The method includes receiving, using at least a processor, composition data from a user. The method includes classifying, using at least a processor, the composition data to one or more composition groups. The method includes providing, using the at least a processor, a composition course as a function of the one or more composition groups, The method includes determining, using at least a processor, an action item as a function of the one or more composition groups. And the method includes generating, using at least a processor, an action strategy as a function of the action item.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system for generating an action strategy. The system includes at least a processor. The system includes a memory communicatively connected to the processor, the memory containing instructions configuring the at least a processor to receive composition data from a user, classify the composition data to one or more composition groups, provide a composition course as a function of the one or more composition groups, determine an action item as a function of the one or more composition groups, and generate an action strategy as a function of the action item. Exemplary embodiments illustrating aspects of the present disclosure are described below in the context of several specific examples.

Figure 1:
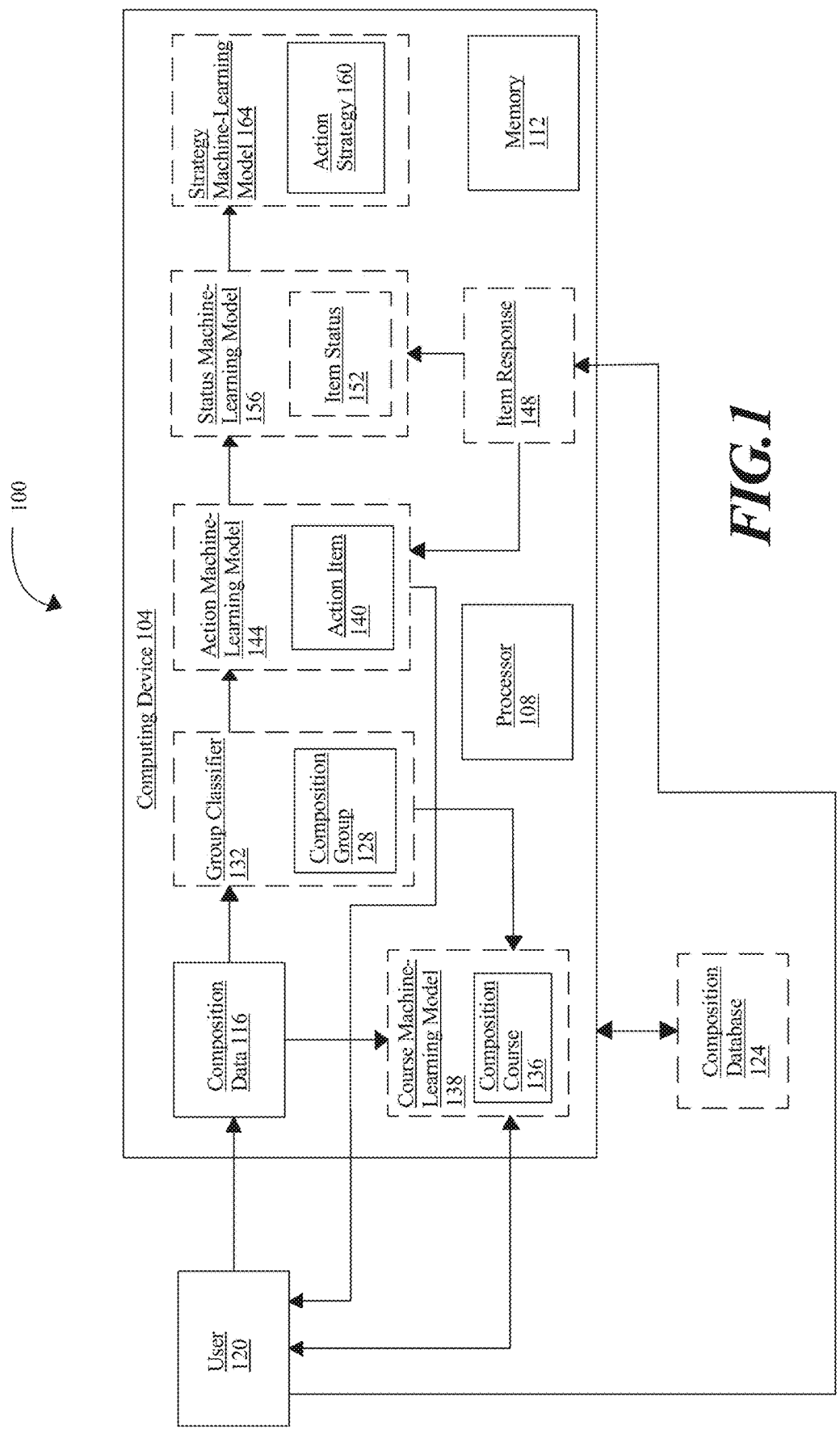
FIG. 1 is an exemplary embodiment of a system for generating an action strategy.

Referring now to FIG. 1, an exemplary embodiment of system 100 is illustrated. System 100 includes computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 includes at least a processor 108 and a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Computing device 104 may include, be included in, and/or communicate with a remote device. As used in this disclosure, a "remote device" is any device suitable for use as a computing device. As a non-limiting example, a remote device may include an end-user device such as a desktop computer, work terminal, laptop computer, netbook, mobile device. As a non-limiting example, a mobile device may include a smartphone or tablet, or the like.

With continued reference to FIG. 1, computing device 104 may be configured to provide a visual interface. A "visual interface," as used in this disclosure, is graphical user interface (GUI) that displays graphical models, as defined below, to a user of a remote device and permits user to manipulate, move, edit, connect together, and/or otherwise interact with such graphical models and/or combinations thereof. Visual interface may include a window in which graphical models, and/or combinations thereof, to be used may be displayed. Visual interface may include one or more graphical locator and/or cursor facilities allowing a user to interact with graphical models and/or combinations thereof, for instance using a touchscreen, touchpad, mouse, keyboard, and/or other manual data entry device Visual interface may include one or more menus and/or panels permitting selection of tools, options, graphical models to be displayed and/or used, elements of data, functions, or other aspects of graphical models to be edited, added, and/or manipulated, options for importation of and/or linking to application programmer interfaces (APIs), exterior services, databases, machine-learning models, and/or algorithms, or the like Persons skilled in the art, upon reviewing the entirety of this disclosure, will be aware of various ways in which a visual interface and/or elements thereof may be implemented and/or used as described in this disclosure.

With continued reference to FIG. 1, memory 112 contains instructions configuring processor 108 to receive composition data 116 from a user 120. As used in this disclosure, a "user" is a person who uses an apparatus. As a non-limiting example, user 120 may include an individual, a family, a business, and/or other groups of persons. As used in this disclosure, "composition data" is any data that is related to a user. In an embodiment, composition data 116 may include user personal information. As a non-limiting example, user personal information may include a name, gender, social security number, personal schedules, hobbies, dependents, family, profession, and the like. In another embodiment, composition data 116 may include user financial information. As a non-limiting example, user financial information may include cash reserves, assets, stocks, bonds, mutual funds, exchange-traded funds (ETF), equity, debts, real estates, incomes, pecuniary goals, business plan, retirement accounts, liabilities, and the like. A pecuniary goal disclosed herein is described further in detail below. In some embodiments, composition data 116 may be stored in strategy database 124. In some embodiments, composition data 116 may be retrieved from strategy database 124. Strategy database 124 disclosed herein is described further in detail below. In some embodiments, at least a processor 108 may interface with application programming interface to obtain composition data 116. As used herein, an "application programming interface," also known as "API" is a set of functions that allow applications to access data and interact with external software components, operating systems, or microdevices, such as a computing device.

With continued reference to FIG. 1, in some embodiments, composition data 116 may include document data. As used in this disclosure, "document data" is any data obtained from documentation submitted by a user. As used in this disclosure, a "documentation" is a material that serves as a record and provides official information. As a non-limiting example, document data may include W-2, paystubs, bank statements, profit and loss (P&L) statements, balance sheet, cash flow statements, income statements, aging reports, budget report, business plan, and the like. In some embodiments, composition data 116 may be filled with document data accordingly once documentation gets submitted by a user. As a non-limiting example, composition data 116 may include a name of a user obtained from document data when document data includes the name of the user from W-2. As another example, composition data 116 may include current cash reserves of a user when document data include the amount of cash reserves of the user from cash flow statements. In some embodiments, a user may input composition data 116 manually. As a non-limiting example, a user may input manually the amount of debts the user has into computer device 104 using a keyboard.

With continued reference to FIG. 1, in some embodiments, at least a processor 108 may obtain document data using optical character recognition. Optical character recognition (OCR) may include automatic conversion of images of written, such as without limitation typed, handwritten or printed text, into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases, OCR may be an "offline" process, which analyses a static document or image frame. In some cases, handwriting movement analysis can be used as input to a handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform, such as without limitation homography or affine transform, to image component to align text. In some cases, a de-speckle process may include removing positive and negative spots and/or smoothing edges. In some cases, a binarization process may include converting an image from color or greyscale to black-and-white, such as without limitation a binary image. Binarization may be performed as a simple way of separating text or any other desired image component from a background of image component. In some cases, binarization may be required for example if an employed OCR algorithm only works on binary images. In some cases. A line removal process may include removal of non-glyph or non-character imagery, such as without limitation boxes and lines. In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-8. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks, for example neural networks as described in reference to FIGS. 2-4.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, at least a processor 108 may obtain document data using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in some embodiments, composition data 116 may include survey data. As used in this disclosure, "survey data" is data obtained from a survey. As used in this disclosure, a "survey" is a data collection tool in which a list of questions is used to gather information about a user. As a non-limiting example, a user may select, type, and the like into a survey. In an embodiment, a survey may allow a user to answer a multiple-choice question. In some embodiments, a user may select one or more answers. In some embodiments, a multiple-choice question may include two choices, three choices, four choices, five choices, six choices, and the like. As a non-limiting example, a user may select a single answer between 'single,' 'married,' 'divorced,' 'widowed,' 'separated,' 'living with partner' for a question of 'what is your marital status?' As a non-limiting example, a user may select multiple answers between 'I didn't have time for investment,' 'I had no any interests in investment,' 'I didn't like the idea of investment,' 'I didn't want to take a risk,' 'I tried doing on my own and failed,' 'I wanted to but I know nothing about investment' for a question of 'what is the reason you have not been investing In another embodiment, a survey may allow a user to answer an ordinal scale question. As used in this disclosure, an "ordinal scale question" is a question that allows to rank a range of items or to choose from an ordered set. The ordinal scale question may be helpful to find the importance level of a matter. As a non-limiting example, a user may rank the importance, using number 1 through 5 with 1 being the most important, between 'high risk, high return,' 'low risk, low return,' 'short term investment, 'long term investment' for a question of 'which investment approach do you prefer?' In another embodiment, a survey may allow a user to answer an interval scale question. As a non-limiting example, a user may select between 'very poor,' 'poor,' 'neutral,' 'good,' 'excellent' for a question of 'Please rate your risk tolerance level.' In some embodiments, a survey may allow a user to answer an open-ended question. As a non-limiting example, a user may type an answer to a question 'Do you have anything you would like to share with us?' As another non-limiting example, a user may type an answer to a question 'What is your financial goal?' Additionally, without limitation, a financial goal disclosed herein may be consistent with a pecuniary goal disclosed in this disclosure.

With continued reference to FIG. 1, processor 108 is configured to classify composition data 116 to one or more composition groups 128. As used in this disclosure, a "composition group" is a set of associative composition data. As a non-limiting example, one or more composition groups 128 may include a tax group, a revenue group, a saving group, an investing group, a retirement group, an inheritance group, and the like. As used in this disclosure, a "tax group" is a group of composition data that is related to tax. As a non-limiting example, a tax group may include a pecuniary goal of a user that is related to a tax. As another non-limiting example, tax group may include composition data 116 related to tax, such as without limitation W-2s, paystubs, social security documents, income statements, previous tax returns, bank account number, and the like. As used in this disclosure, a "revenue group," is a group of composition data that is related to revenue. As a non-limiting example, a revenue group may include a pecuniary goal related to a revenue. As another non-limiting example, a revenue group may include composition data 116 related to revenue, such as without limitation income statements, bank account number, cash flow statement, and the like. As used in this disclosure, a "saving group" is a group of composition data that is related to saving. As a non-limiting example, a saving group may include a pecuniary goal related to a saving. As another non-limiting example, a saving group may include composition data 116 related to saving, such as without limitation saving bank account number, bank statement, and the like. As used in this disclosure, an "investing goal group" is a group of composition data that is related to investing. As a non-limiting example, an investing group may include a pecuniary goal of a user that is related to investing. As another non-limiting example, investing group may include composition data 116 related to investing, such as without limitation balance sheets, investment income forms, bank statements, and the like.

With continued reference to FIG. 1, in some embodiments, each of one or more composition groups 128 may include a goal group. As used in this disclosure, a "goal group" is a group that includes a composition data that is related to a pecuniary goal. The pecuniary goal disclosed herein is further described below. As a non-limiting example, a goal group may include a tax goal group, investing goal group, revenue goal group, saving goal group, retirement goal group, inheritance goal group, and the like. In an embodiment, each of one or more composition groups 128 may include a plurality of pecuniary goals. As a non-limiting example, an investing group may include an investing goal group that includes a plurality of pecuniary goals, wherein the plurality of pecuniary goals may include 'investing into three new entities in stock' and 'buying a house.' In another embodiment, each of one or more composition groups 128 may not include a goal group. As a non-limiting example, a tax group may not include a tax goal group when a user 120 does not have a pecuniary goal related to tax. As another non-limiting example, each of one or more composition groups 128 may not include an inheritance goal group when a user 120 does not have a pecuniary goal related to inheritance. In some embodiments, each of one or more composition groups 128 may include a non-goal group. For the purposes of this disclosure, a "non-goal group" is composition data that is not related to a pecuniary goal of a user. As a non-limiting example, a non-goal group may include user personal information, such as without limitation a name, gender, family, dependent, and the like. As a non-limiting example, a non-goal group may include document data that is not related to a pecuniary goal such as without limitation W-2, bank statement, P&L statement, balance sheet, and the like. As another non-limiting example, non-goal group may include survey data that is not related to a pecuniary goal.

With continued reference to FIG. 1, as used in this disclosure, a "pecuniary goal" is a target to aim for when managing money of a user. In some embodiments, a pecuniary goal may include a goal for saving, spending, earning, investing, retirement, inheritance, and the like. As a non-limiting example, a pecuniary goal may include saving 100,000 dollars over ten months. As another non-limiting example, a pecuniary goal may include growing 200,000 dollars over a year. As another non-limiting example, a pecuniary goal may include reducing tax liability. As another non-limiting example, a pecuniary goal may include planning a retirement plan. As another non-limiting example, a pecuniary goal may include reducing debt. As another non-limiting example, a pecuniary goal may include improving the profit margin. As another non-limiting example, a pecuniary goal may include revenue growth. As another non-limiting example, a pecuniary goal may include managing cash flow. As another non-limiting example, a pecuniary goal may include passing wealth on to a user's children. As a non-limiting example, a pecuniary goal may include merging with another firm. As a non-limiting example, a pecuniary goal may include getting a new partner for a company. In an embodiment, a pecuniary goal may be manually input by a user 120. As a non-limiting example, at least a processor 108 may receive a pecuniary goal from document data. As another non-limiting example, at least a processor 108 may receive a pecuniary goal from survey data. As another non-limiting example, a user 120 may manually input a pecuniary goal to at least a processor 108. In another embodiment, pecuniary goal may be put by an advisor, wherein the advisor disclosed herein is described further in detail below.

With continued reference to FIG. 1, in some embodiments, composition data 116 may be classified to one or more composition groups 128 using a group classifier 132. As used in this disclosure, a "group classifier" is a machine-learning model, such as a mathematical model, neural net, or program generated by a machine learning algorithm known as a "classification algorithm," that sorts composition data related inputs into categories or bins of data, outputting a plurality of composition groups associated therewith. The group classifier 132 disclosed herein may be consistent with a classifier disclosed with respect to FIG. 2. In some embodiments, a group classifier 132 may be trained with training data correlating composition data 116 to one or more composition group 128. As a non-limiting example, a group classifier 132 may be trained with group training data that correlates document data of W-2 to tax group and revenue group. As another non-limiting example, a group classifier 132 may be trained with group training data that correlates composition data 116 of bank account number to revenue group, saving group, heritance group and retirement group. As another non-limiting example, a group classifier 132 may be trained with group training data that correlates composition data 112 of previous tax returns to tax group. As another non-limiting example, a group classifier 132 may correlate composition data 116 of a pecuniary goal related to investing to investing group. In some embodiments, the training data may be received from a user 120, composition database 124, external computing devices, and/or previous iterations of processing. In some embodiments, group classifier 132 may classify composition data 116 into one or more composition groups 128 as a function of a pecuniary goal of a user.

With continued reference to FIG. 1, in some embodiments, composition data 116 may be classified to one or more composition groups 128 using a group lookup table. A "lookup table," for the purposes of this disclosure, is an array of data that maps input values to output values. A lookup table may be used to replace a runtime computation with an array indexing operation. As a non-limiting example, a course lookup table may relate a user financial information of composition data 116 to one or more composition groups 128. As a non-limiting example, a computing device 104 may relate user personal information to a non-goal group of composition group 128. As another non-limiting example, a group lookup table may relate user financial information to a plurality of goal groups of composition course 136. As a non-limiting example, computing device 104 may be configured to "lookup" a given pecuniary goal of a user to find a corresponding a plurality of goal groups of composition courses 136. As a non-limiting example, computing device 104 may be configured to "lookup" a given pecuniary goal of a user to 'reduce tax liability' in order to find a corresponding one or more composition groups 128 such as without limitation a tax group. As another non-limiting example, computing device 104 may be configured to "lookup" a given composition data 116 of bank statements in order to find a corresponding one or more composition groups 128 such as without limitation, a saving group, an investing group, a retirement goal group, and the like.

With continued reference to FIG. 1, in some embodiments, one or more composition groups 128 may be reviewed by an advisor. As used in this disclosure, an "advisor" is a person who is a professional related to a matter. As a non-limiting example, an advisor may include a service team, an attorney, a financial advisor, a certified public accountant (CPA), an auditor, and the like. In some embodiments, each of a plurality of advisors may have different accessibility to one or more composition groups 128. As used in this disclosure, "accessibility" refers to the limited ability to get access to one or more composition groups, for instance and without limitation as established using digital and/or computer access rights. As a non-limiting example, a financial advisor may have accessibility to tax group and invest goal group, but not to non-goal group. As another non-limiting example, a CPA may have accessibility to tax group but not to invest goal group. As another non-limiting example, a service team may only have accessibility to a non-goal group. In some embodiments, a user may be able to communicate with an advisor. As a non-limiting example, a user may be able to communicate with an attorney using a live chat. As used in this disclosure, a "live chat" is a medium that allows a user to interact with an advisor in real-time. In an embodiment, a user may communicate with an advisor through a call. In another embodiment, a user may communicate with an advisor through a message. In another embodiment, a user may interact with an advisor through an email.

With continued reference to FIG. 1, in some embodiments, at least a processor 108 is configured to provide a composition course 136. As used in this disclosure, a "composition course" is an informative session that provides information to a user. In some embodiments, composition courses 136 may allow a user to develop one's financial knowledge. In an embodiment, composition course 136 may include a definition of terms for composition data 116. As a non-limiting example, composition course 136 may include information on 'what is cash reserves', 'what is financial goal', 'what is liability', 'what is risk-tolerance,' and the like. In another embodiment, composition course 136 may include information on how to put one or more composition data 116 to a computing device 104. As a non-limiting example, composition course 136 may include information on 'how to fill a tax return', 'how to set financial goals', and the like. In some embodiments, composition course 136 may include an assessment. For the purposes of this disclosure, an "assessment" is a type of test that evaluates a user's knowledge. In an embodiment, an assessment may include a question that tests a user 120's pecuniary knowledge. As a non-limiting example, pecuniary knowledge may include knowledge on tax, loan, debt, earning money, saving money, investing, setting a pecuniary goal, and the like. In some embodiments, an assessment may allow a user 120 to type, click, move, speak, and the like. In an embodiment, a user 120 may pass an assessment when the user 120 inputs a correct answer to a question of the assessment. In another embodiment, a user 120 may fail an assessment when the user 120 inputs a wrong answer to a question of the assessment. In some embodiments, a user 120 may retake an assessment when the user failed the assessment. In some embodiments, a user 120 may skip to retake an assessment if the user 120 wants to skip it. In some embodiments, composition course 136 may include one or more formats. In an embodiment, composition course 136 may include a format of text. As used in this disclosure, a format of "text" refers to a format of a written words. As a non-limiting example, composition course 136 may allow a user to read a definition of liability written in text format. In another embodiment, composition course 136 may include a video format. As a non-limiting example, composition course 136 may include a video lecture explaining a difference between value investing and quality investing. As another non-limiting example, composition course 136 may include a video lecture explaining how to fill a tax return. In another embodiment, composition course 136 may include audio format. In some embodiments, a user may interact with composition course 136. As a non-limiting example, a user may interact with composition course 136 by selecting, deleting, moving, typing, and the like.

With continued reference to FIG. 1, in some embodiments, composition course 136 may be provided to a user 120 before the user input composition data 116 into computing device 104. As a non-limiting example, at least a processor 108 may provide a lecture on 'how to set a pecuniary goal' to a user before the user put a pecuniary goal into computing device 104. As another non-limiting example, at least a processor 108 may provide a definition of a cash reserve to a user before the user put amount of cash reserve the user has into computing device 104. In some embodiments, composition course 136 may be determined as a function of one or more composition groups 128. In some embodiments, composition course 136 may be provided to a user after the user put composition data 116 into computing device. As a non-limiting example, at least a processor 108 may provide a video lecture of explaining a difference between value investing and quality investing to a user when the user put composition data 116, such as without limitation a pecuniary goal related to investing, into computing device 104.

With continued reference to FIG. 1, in some embodiments, composition course 136 may be provided to a user 120 after the user 120 input composition data 116 into computing device 104. As a non-limiting example, at least a processor 108 may provide an assessment to a user 120, wherein the assessment may include a question that tests the user 120's pecuniary knowledge. In some embodiments, composition course 136 may include an assessment that may include a question that tests if a user 120 remembers a content from a previous composition course 136. As a non-limiting example, if at least a processor 108 provided a composition course 136 of a definition of liability, another composition course 136 that includes an assessment that tests a user 120's knowledge on the definition of liability may be provided to the user 120. As another non-limiting example, if at least a processor 108 provided a composition course 136 of a lecture of explaining how to fill a tax return, another composition course 136 that includes an assessment that tests a user 120's knowledge on how to fill a tax return may be provided to the user 120. In an embodiment, a user 120 may decide to take a composition course 136. In another embodiment, a user 120 may decide to skip a composition course 136. In some embodiments, an advisor may add a composition course 136 for a user 120. In some embodiments, an advisor may remove a composition course 136 for a user 120.

With continued reference to FIG. 1, in some embodiments, composition course 136 may be determined using a course lookup table. As a non-limiting example, a course lookup table may relate one or more composition groups 128 to composition course 136. As a non-limiting example, a computing device 104 may relate a non-goal group to composition course 136. As another non-limiting example, a course lookup table may relate user financial information to composition course 136. As a non-limiting example, computing device 104 may be configured to "lookup" a given pecuniary goal of a user to find a corresponding composition course 136. As a non-limiting example, computing device 104 may be configured to "lookup" a given pecuniary goal of a user to 'reduce tax liability' in order to find a corresponding composition course 136, such as a text of a definition of liability, a video lecture of a number of methods that can be used to reduce tax liability, and the like.

With continued reference to FIG. 1, in some embodiments, at least a processor 108 may determine a composition course 136 using a course machine-learning model 138. As used in this disclosure, a "course machine-learning model" is a machine-learning model that is used to determine a composition course. In some embodiments, a course machine-learning model 138 may be trained with course training data correlating one or more composition groups 128 to composition course 136. As a non-limiting example, a course machine-learning model 138 may be trained with course training data correlating a tax group to composition course 136 of assessment related to a tax. As another limiting example, a course machine-learning model 138 may be trained with course training data correlating an investing group to a composition course 136 of a lecture related to an investing. In some embodiments, a course machine-learning model 138 may be trained with course training data correlating composition data 116 to composition course 136. As a non-limiting example, a course machine-learning model 138 may correlate a composition data 116 to a composition course 136 of a definition of the composition data 116. In some embodiments, a course machine-learning model 138 may be trained with course training data correlating a course composition course 136 to another course composition course 136. As a non-limiting example, a course learning-machine model 138 may correlate a composition course 136 of a lecture of explaining how to fill a tax return to another composition course 136 that includes an assessment that tests a user 120's knowledge on how to fill a tax return. In some embodiments, composition course 136 may be provided in sequence. In some embodiments, a second composition course 136 may be provided as a first composition course 136 is completed. As a non-limiting example, a user 120 may not be able to take a second composition course 136 unless the user 120 takes and/or passes a first composition course 136. In some embodiments, course training data may be received from a user 120, an advisor, composition database 124, external computing devices, previous iterations of processing, and/or the like.

With continued reference to FIG. 1, in some embodiments, at least a processor 108 may determine a composition course 136 using a course lookup table. As a non-limiting example, a course lookup table may relate one or more composition group 128 to composition course 136. In some embodiments, at least a processor 108 may 'lookup' a given one or more composition groups 128 to find a corresponding composition course 136 using a course lookup table. As a non-limiting example, at least a processor 108 may 'lookup' a tax group to find a corresponding composition course 136 related to tax. In some embodiments, at least a processor 108 may 'lookup' a given composition data 116 to find a corresponding composition course 136 using a course lookup table. As a non-limiting example, at least a processor 108 may 'lookup' a given composition data 116 of a user 120's pecuniary goal to a composition course 136 of 'how to set a pecuniary goal.' In some embodiments, at least a processor 108 may 'lookup' a given composition course 136 to find a corresponding composition course 136 using a course lookup table. As a non-limiting example, at least a processor 108 may correlate a composition course 136 of a lecture of explaining how to fill a tax return to another composition course 136 that includes an assessment that tests a user 120's knowledge on how to fill a tax return using a course lookup table.

With continued reference to FIG. 1, a processor 108 is configured to determine an action item 140. As used in this disclosure, an "action item" is any action that is needed to be taken to generate an action strategy. In some embodiments, action item 140 may include a course action, document action, advisor action, focus action, research action, and the like. As used in this disclosure, a 'course action' is an action related to a composition course. As a non-limiting example, a course action may include 'take a course,' 'retake a course,' and the like. The course disclosed herein may be a composition course 136. As used in this disclosure, a 'document action' is an action related to documentation. As a non-limiting example, a document action may include 'submit documentation,' 'review documentation,' and the like. As used in this disclosure, an 'advisor action' is an action related to a review. As a non-limiting example, a review action may include 'a meeting with an advisor,' 'chatting with an advisor,' and the like. As a non-limiting example, a meeting with an advisor may include live chatting, speaking on a call, sending an email, a meeting in person, and the like. As used in this disclosure, a "focus action" is an action related to determining a focus of an action strategy. As used in this disclosure, a "focus" of an action strategy is a main point of attention of an action strategy. As a non-limiting example, a focus action may include 'determine a focus,' 'review a focus,' 'change a focus,' and the like. As used in this disclosure, a "research action" is action related to gathering information for an action strategy. As a non-limiting example, a research action may include 'research a trust entity,' 'research a real estate entity,' 'research tax law,' 'research inheritance law,' 'research employment law,' 'research incorporate law,' and the like. In some embodiments, action item 140 may be stored in composition database 124. In some embodiments, action item 140 may be retrieved from composition database 124.

With continued reference to FIG. 1, in some embodiments, at least a processor 108 is configured to determine action item 140 as a function of one or more composition groups 128. In some embodiments, action item 140 may be determined as a function of a goal group of one or more composition groups 128 using an action criterion. As used in this disclosure, an "action criterion" is a standard by which whether an action strategy can be generated is decided. In an embodiment, an action criterion may include a list of documentations to be submitted by a user 120. As a non-limiting example, an action criterion may include 'W-2,' 'paystubs,' 'bank statements,' 'profit and loss (P&L) statements,' 'balance sheet,' 'cash flow statements,' 'income statements,' 'aging reports,' 'budget report,' 'business plan,' and the like. In another embodiment, an action criterion may include a list of action items 140 to be submitted by a user 120. As a non-limiting example, action criterion may include 'submit documentation,' 'review documentation,' 'a meeting with an advisor,' 'take composition course,' 'retake composition course,' 'research,' and the like. In some embodiments, at least a processor 108 may include an action criterion for each of a plurality of goal groups of one or more composition groups 128. As a non-limiting example, each of a tax goal group, an investing goal group, a revenue goal group, a saving goal group, a retirement goal group, an inheritance goal group may include an action criterion. As a non-limiting example, an action criterion may include 'submit documentation' for a tax goal group. As another non-limiting example, an action criterion may include 'submit documentation,' 'a meeting with an advisor,' 'take composition course,' 'research incorporate law' for an investing goal group. In some embodiments, an action criterion may be input by a user 120. In some embodiments, an action criterion may be input by an advisor 120. In some embodiments, an action criterion may be stored in composition database 124. In some embodiments, an action criterion may be retrieved from composition database 124. As a non-limiting example, an action criterion may include previously used action criterion.

With continued reference to FIG. 1, in some embodiments, action item 140 may be determined as a function of composition data 116. As a non-limiting example, action item 140 may be 'review a documentation' for composition data 116 of document data submitted by user 120. As another non-limiting example, action item 140 may be 'a meeting with an advisor' for user financial information input by a user 120. As another non-limiting example, action item 140 may include 'take a course' for user financial information input by a user 120.

With continued reference to FIG. 1, in some embodiments, at least a processor 108 may determine action item 140 using an action machine-learning model 144. As used in this disclosure, an "action machine-learning model" is a machine-learning model that determines action item 140. In some embodiments, action machine-learning model 144 may be trained with action training data correlating composition data 116 to action item 140. As a non-limiting example, action machine-learning model 144 may determine 'review documentation' for submitted income statement. As another non-limiting example, action machine-learning model 144 may determine 'take a course' for submitted income statement. In some embodiments, action machine-learning model 144 may be trained with action training data correlating one or more composition groups 128 to action item 140. In some embodiments, action machine-learning model 144 may determine 'a meeting with an advisor' for a tax goal group. In some embodiments, action machine-learning model 144 may be trained with action training data correlating an action criterion to action item 140. As a non-limiting example, action machine-learning model 144 may determine action item 140 of 'submit documentation,' 'a meeting with an advisor,' 'take composition course,' 'research incorporate law' for an investing goal group when an action criterion for the investing goal group includes 'submit documentation,' 'a meeting with an advisor,' 'take composition course,' 'research incorporate law.' In some embodiments, action training data may be received from a user 120, an advisor, composition database 124, external computing devices, previous iterations of processing, and/or the like.

With continued reference to FIG. 1, in some embodiments, at least a processor 108 may determine action item 140 using an action lookup table. In an embodiment at least a processor 108 may relate one or more composition data 116 to action item 140 using an action lookup table. As a non-limiting example, at least a processor 108 may 'lookup' a given tax goal group to action item of 'take a course.' In another embodiment, at least a processor 108 may relate composition data 116 to action item 140 using an action lookup table. As a non-limiting example, at least a processor 108 may 'lookup' a given document data to action item 140 of 'review a documentation.' In some embodiments, at least a processor 108 may relate an action criterion to action item 140 using an action lookup table. As a non-limiting example, at least a processor 108 may 'lookup' action criterion for a tax goal group and determine action item 140 using an action lookup table.

With continued reference to FIG. 1, in some embodiments, at least a processor 108 may obtain item response. As used in this disclosure, an "item response" is any response to an action item. In an embodiment, at least a processor 108 may obtain an item response 148 from a user 120. In another embodiment, at least a processor 108 may obtain item response 148 from an advisor. As a non-limiting example, item response 148 may include a course response, a focus response, an advisor response, a document response, a research response, and the like. As used in this disclosure, a "course response" is a response related to a course action. As a non-limiting example, a course response may include a user 120 taking a composition course 136, retaking a composition course 136, skipping a composition course 136, and the like. As another non-limiting example, a course response may include an advisor adding a composition course 136, removing a composition course 136, and the like.

With continued reference to FIG. 1, as used in this disclosure, a "focus response" is a response related to a focus action. As a non-limiting example, a focus response may include choosing a focus of an action strategy 160, choosing a focus level of an action strategy 160, changing a focus of an action strategy 160, changing a focus level of an action strategy 160, and the like. As used in this disclosure, a "focus level" is a level of interest. As a non-limiting example, a focus level of an action strategy may be scored from 0 to 5, wherein 0 is the lowest interest and 5 is the highest interest. In an embodiment, a focus response may be choosing which pecuniary goal of one or more composition groups 128 is to be focused on for an action strategy 160. As a non-limiting example, a focus response may include choosing 5 as a focus level for a goal group of a tax group and choosing 0 as a focus level for a goal group of saving group. As another non-limiting example, a focus response may include choosing 4 as a focus level for a goal group of an investing group and choosing 2 as a focus level for a goal group of an inheritance group. In an embodiment, a user 120 may input focus response to at least a processor 108. In another embodiment, an advisor 120 may input focus response to at least a processor 108. In some embodiments, at least a processor 108 may obtain a focus response from a focus machine-learning model. In some embodiments, a focus machine-learning model may be trained with focus training data that correlates a pecuniary goal in one or more composition groups 128 to a focus level. As a non-limiting example, focus training data may correlate a pecuniary goal related to tax to a focus level of 5. As another non-limiting example, focus training data may correlate a pecuniary goal related to investing to a focus level of 4. In some embodiments, focus training data may be received from a user 120, an advisor, composition database 124, external computing devices, and/or previous iterations of processing. In some embodiments, focus level may be stored in composition database 124. In some embodiments, focus level may be retrieved from composition database 124.

With continued reference to FIG. 1, as used in this disclosure, an "advisor response" is a response related to an advisor action. As a non-limiting example, an advisor response may include a user 120 meeting with an advisor in person on December, amount of time a user 120 liked with an advisor on the phone on Monday, a number of times a user 120 sent an email with an advisor, and the like. As used in this disclosure, a "document response" is a response related to document action. As a non-limiting example, a document response may include a user 120 submitting a document related to tax, a user 120 submitting a document related to investing, an advisor reviewing a submitted documentation, an advisor requesting a documentation, and the like. As used in this disclosure, a "research response" is a response related to a research action. As a non-limiting example, a research response may include an advisor researching a trust entity for a user 120, an advisor researching tax law for a user 120, a user 120 researching a real estate entity, and the like.

With continued reference to FIG. 1, in some embodiments, at least a processor 108 may determine item status 152 of action item 140. As used in this disclosure, an "item status" is a status of an action item. As a non-limiting example, 'pending,' 'active,' 'complete,' 'action required,' 'incomplete,' and the like. As a non-limiting example, an item status 152 of action item 140 may be 'pending' when the action item 140 needs to be reviewed by a user 120. In an embodiment, at least a processor 108 may determine an item status 152 of action item 140 as a function of composition data 116. As a non-limiting example, an item status 152 of an action item 140 of 'submit a tax document' may be complete when there is composition data 116 of tax document. In some embodiments, at least a processor 108 may determine an item status 152 of action item 140 as a function of an item response 148. As another non-limiting example, an item status 152 of action item 140 may be 'complete' when the action item 140 is reviewed by an advisor. As another non-limiting example, an item status 152 of action item 140 may be 'action required' when the action item 140 needs to be reviewed by an advisor and/or a user 120 after receiving an item response 148. As another non-limiting example, action item 140 may be 'active' when a user 120 and/or an advisor is in the process of item response 148. As another non-limiting example, item status 152 may be 'complete' after receiving an item response 148 from a user 120 and/or an advisor. In some embodiments, a user 120 and/or an advisor may change item status 152 manually. In some embodiments, item status 152 may be stored in composition database 124. In some embodiments, at least a processor 108 may track item status 152.

With continued reference to FIG. 1, in some embodiments, item status 152 may include a course status. As used this disclosure, a "course status" is a status of a composition course provided to a user. In some embodiments, a course status may include a completion status of a composition course 136. As a non-limiting example, a course status may be 'complete' when a course response is that a user 120 took a composition course 136. As another non-limiting example, a course status may be 'complete' when a course response is that a user 120 passed a composition course 136. As another non-limiting example, a course status may be 'complete' when a course response is that a user 120 skipped a composition course 136. As another non-limiting example, a course status may be 'incomplete' when a course response is that a user 120 did not take a composition course 136. As another non-limiting example, a course status may be 'incomplete' when a course response is that a user 120 did not pass a composition course 136. In some embodiments, an item status 152 may include a focus status, advisor status, document status, research status, and the like.

With continued reference to FIG. 1, in some embodiments, at least a processor 108 may determine an item status 152 of action item 140 using a status machine-learning model 156. As used in this disclosure, a "status machine-learning model" is a machine-learning model that determines a status of an action item. In some embodiments, a status machine-learning model 156 may be trained with status training data correlating an item response 148 to an item status 152. As a non-limiting example, a status machine-learning model 156 may determine an item status 152 of an action item 140 to be 'complete' when an item response 148 to the action item 140 from a user 120 is 'taking a course.' In some embodiments, a status machine-learning model 156 may be trained with status training data correlating composition data 116 to an item status 152. As a non-limiting example, a status machine-learning model 156 may determine an action status XXX of an action item XXX to be complete' when composition data 116 of document data related tax is submitted by a user 120. In some embodiments, the training data may be received from a user 120, an advisor, composition database 124, external computing devices, and/or previous iterations of processing. In some embodiments, at least a processor 108 may be configured to determine action item 140 by generating, using an action machine-learning model 144, a first action item 140, receiving, using the at least a processor 108, a course response from a user 120 for the first action item 140, determining, using a status machine-learning model 156, a completion status of a composition course 136 whether the composition course 136 is completed by the user 120, and identifying, using an action machine-learning model 144, a second action item 140 as a function of the completion status of the composition course 136.

With continued reference to FIG. 1, at least a processor 108 is configured to generate an action strategy 160. As used in this disclosure, an "action strategy" is a plan to achieve a user's goal. As a non-limiting example, action strategy 160 may include tax strategy, revenue strategy, investing strategy, saving strategy, retirement strategy, inheritance strategy. In some embodiments, at least a processor 108 may generate a plurality of action strategy 160. As a non-limiting example, at least a processor 108 may generate tax strategy, investing strategy, and retirement strategy. In some embodiments, an action strategy 160 may include a plurality of steps. As a non-limiting example, an action strategy 160 may include step 1 to 5, 1 to 3, 1 to 10, and the like, wherein 1 is a first step. As a non-limiting example, an action strategy 160 may include a step 1 for a tax strategy, a step 2 for an investing strategy, a step 3 for an inheritance strategy. As another non-limiting example, an action strategy 160 may include a step 1, 2, 3, 4, 5 for a tax strategy. In some embodiments, an advisor may manually generate an action strategy 160. In some embodiments, an action strategy may be stored in composition database 124. In some embodiments, an action strategy may be retrieved from composition database 124.

With continued reference to FIG. 1, in some embodiments, at least a processor 108 is configured to generate an action strategy 160 as a function of action item 140. In some embodiments, at least a processor 108 may generate an action strategy 160 as a function of an item status 152 of action item 140. As a non-limiting example, at least a processor 108 may generate an action strategy 160 when an item status 152 of every action item 140 is 'complete.' As another non-limiting example, at least a processor 108 may not generate an action strategy 160 when an item status 152 of every action item 140 is 'incomplete.' As another non-limiting example, at least a processor 108 may not generate an action strategy 160 when an item status of some action items 140 is 'active.' As another non-limiting example, at least a processor 108 may not generate an action strategy 160 when an item status 152 of some action items 140 is 'pending' and an item status 152 of some other action items 140 is 'complete.' In some embodiments, at least a processor 108 may generate an action strategy 160 as a function of an item status 152 of action item 140 and a focus level of one or more composition groups 128. As a non-limiting example, at least a processor 108 may generate an action strategy 160 when an item status 152 of an action item 140 is 'incomplete' and a focus level of a goal group of one or more composition groups 128 is 0. In some embodiments, at least a processor 108 may generate a plurality of steps for action strategy 160 as a function of a focus level of one or more composition groups 128. As a non-limiting example, action strategy 160 may include a step 1, wherein the step 1 is an action strategy for a pecuniary goal of a tax goal group that includes a focus level of 5, a step 2, wherein the step 2 is an action strategy for another pecuniary goal of a tax goal group that includes a focus level of 4, a step 3, wherein the step 3 is an action strategy for a pecuniary goal of an investing goal group that includes a focus level of 2.

With continued reference to FIG. 1, in some embodiments, action strategy 160 may be determined using a strategy machine-learning model 164. As used in this disclosure, a "strategy machine-learning model" is a machine-learning model that generates an action strategy. In some embodiments, a strategy machine-learning model 164 may be trained with strategy training data that correlates item status 152 to an action strategy 160. As a non-limiting example, a strategy machine-learning model 164 may determine to generate an action strategy 160 when an item status 152 of action item 140 is 'complete.' In some embodiments, a strategy machine-learning model 164 may be trained with strategy training data that correlates focus level to an action strategy 160. As a non-limiting example, a strategy machine-learning model 164 may determine to generate an action strategy 160 when a focus level of one or more composition groups 128 is 0. As another non-limiting example, a strategy machine-learning model 160 may determine to generate a plurality of steps for an action strategy 160 when one or more composition groups 128 includes a plurality of focus levels. In some embodiments, strategy training data may be received from an advisor, composition database 124, external computing devices, and/or previous iterations of processing.

With continued reference to FIG. 1, in some embodiments, generating action strategy 160 may include generating a report. As used in this disclosure, a "report" is information gathered through in an embodiment, a report may graphically represent composition data 116. In another embodiment, a report may graphically represent one or more composition groups 128. In some embodiments, a report may graphically represent action strategy 160. As a non-limiting example, a report may include a flow diagram, a graph, a text report, an image, a chart, a video, an audio, and the like. As another non-limiting example, a report may include a flow diagram of cash reserves, a flow diagram of profit development, a strategy map for investing. As another non-limiting example, a report may include a chart of one or more composition groups 128. As another non-limiting example, a report may include a list of action strategies 160 taken for a user 120. As another non-limiting example, a report may include a list of action strategies 160 140 that will be proceeded in the future. In some embodiments, at least a processor 108 may generate a report using a graph machine-learning model. As used in this disclosure, a "graph machine-learning model" is a machine-learning model that generates a graph. In some embodiments, a graph machine-learning model may be trained with graph training data that receives data and generates a graph with the data. In some embodiments, graph training data may receive composition data 116, composition groups 128, composition course 136, action strategy 160, and the like. In some embodiments, graph training data may be received from a user 120, an advisor, composition database 124, external computing devices, and/or previous iterations of processing.

With continued reference to FIG. 1, system 100 includes a strategy database 124. In some embodiments, strategy database 124 may include composition data 116, composition group 128, composition course 136, action item 140, action strategy 160, a recent activity, and the like. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 2:
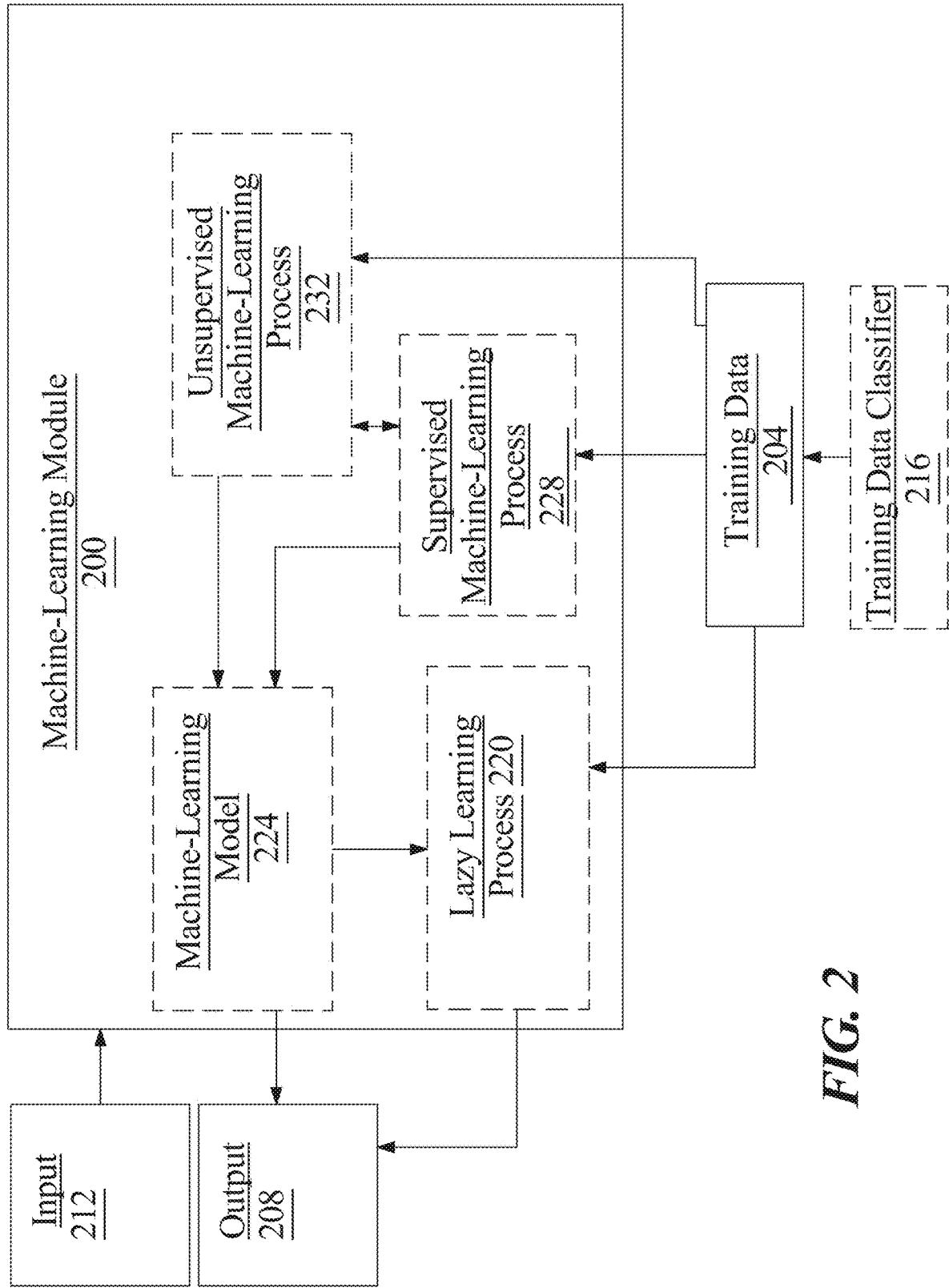
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a system 100/module to produce outputs 208 given data provided as inputs 212; this is in contrast to a non-machine learning software program where the commands to be executed are determined in advance by a user and written in a programming language.

With continued reference to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

With continued reference to FIG. 2, training data may be filtered, sorted, and/or selected using one or more supervised and/or unsupervised machine-learning processes and/or models as described in further detail below; such models may include without limitation a training data classifier 218. Training data classifier 218 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a system 100 and/or any module and/or component operating thereon derives a classifier from training data 204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory 118; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With continued reference to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
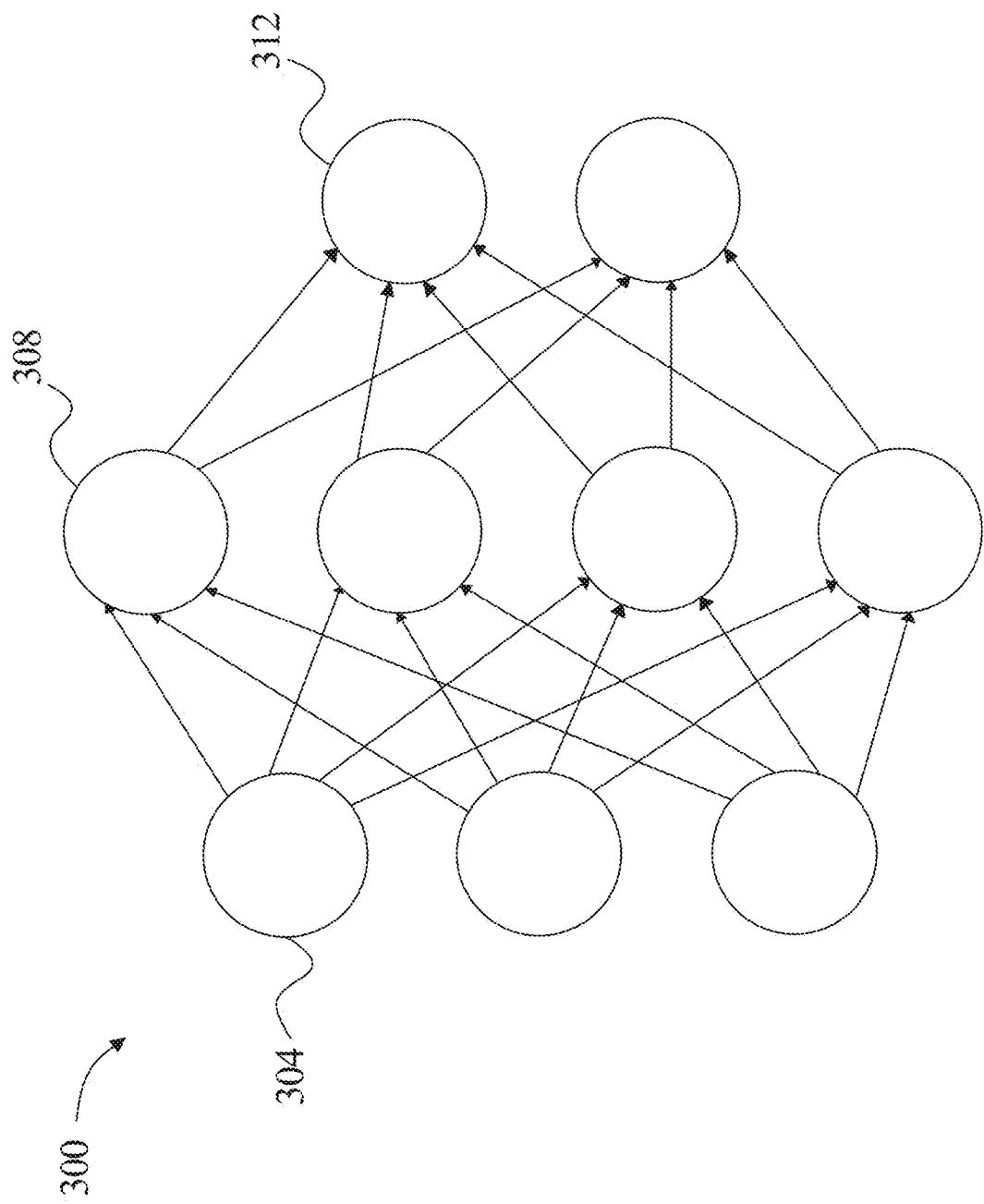
FIG. 3 is an exemplary embodiment of neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
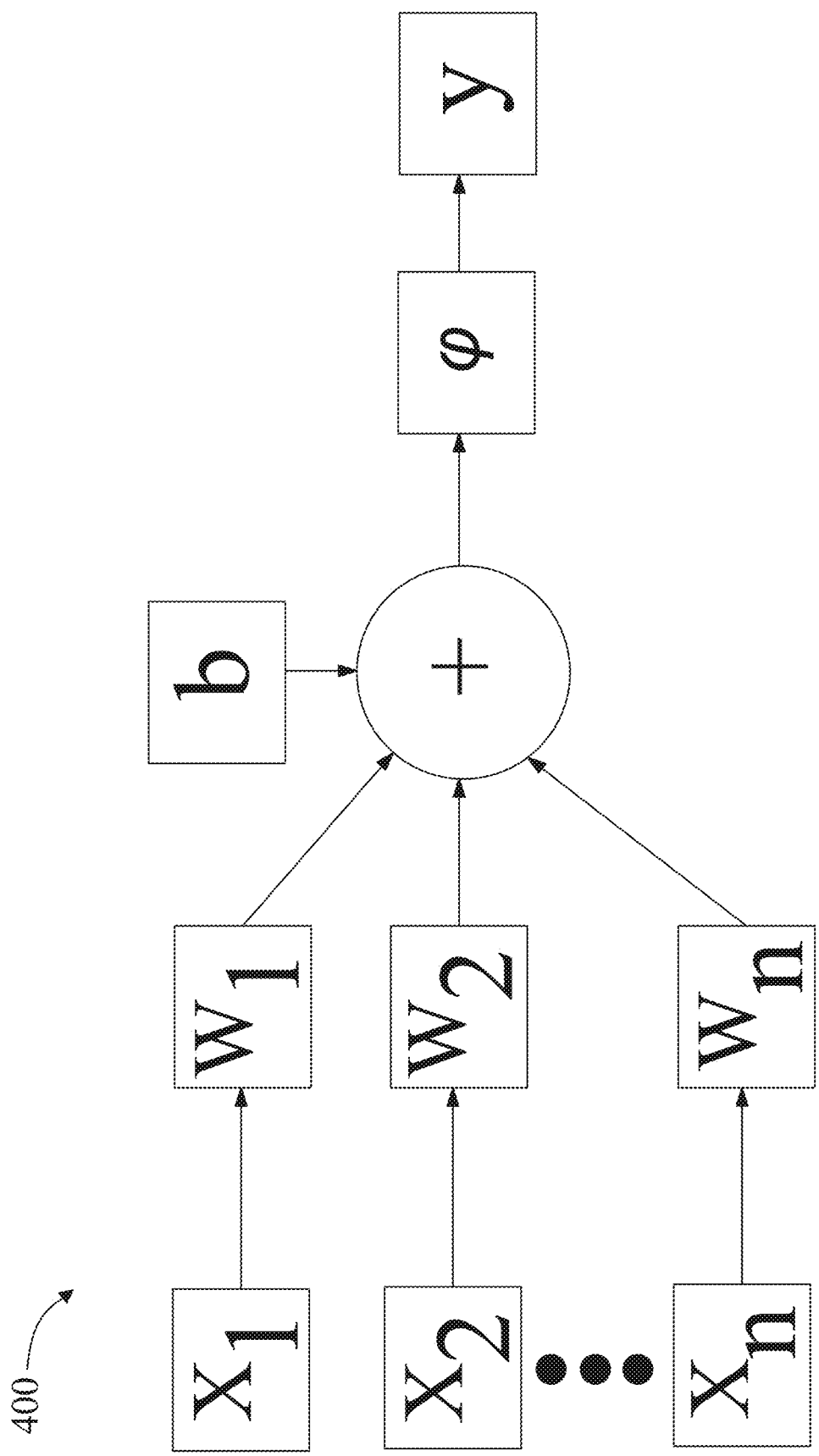
FIG. 4 is a diagram of an exemplary embodiment of a node of a neural network.

Referring now to FIG. 4, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more input y, for instance by the corresponding weight.

Figure 5:
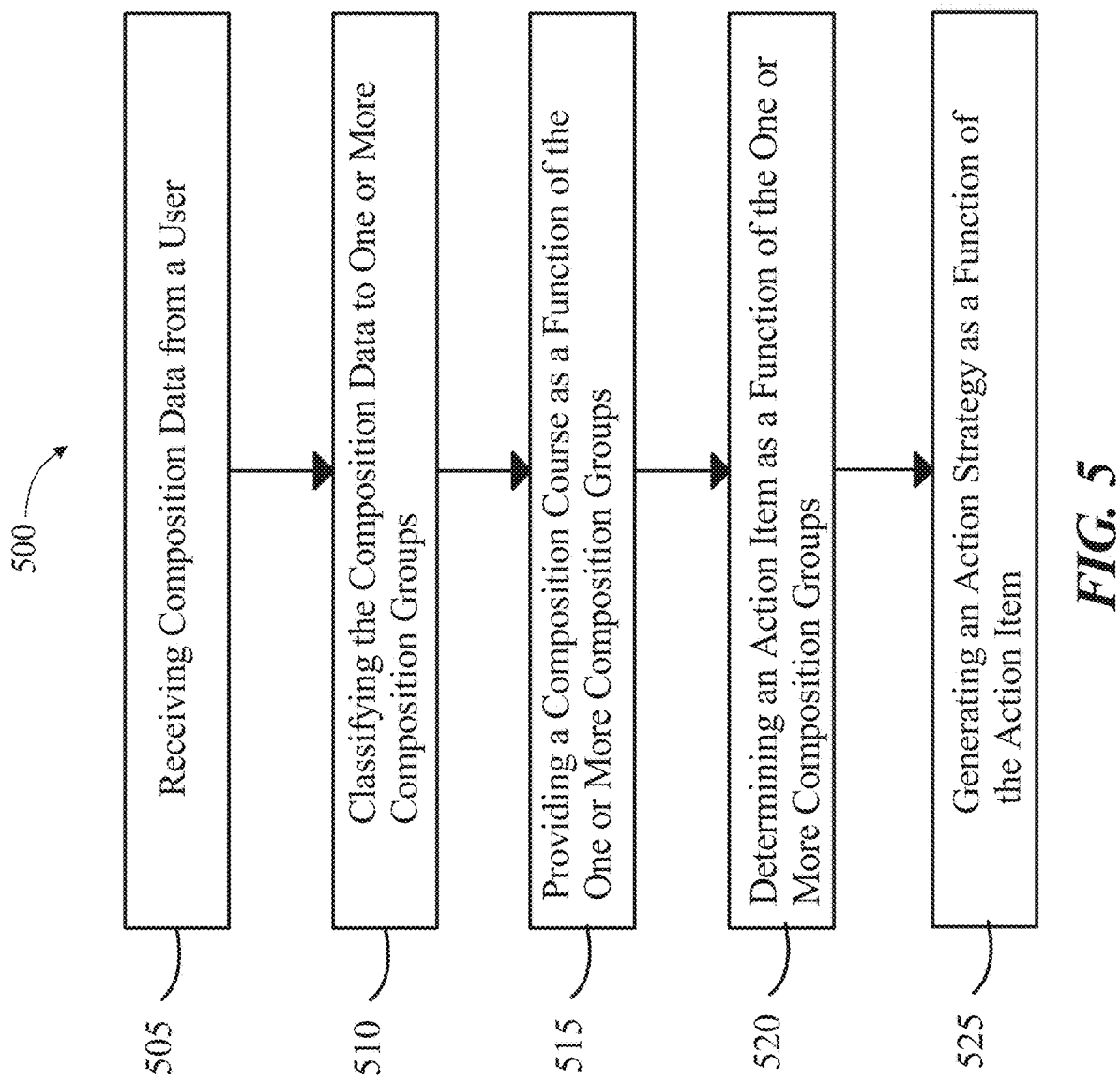
FIG. 5 is a flow diagram of an exemplary method for generating an action strategy.

Referring now to FIG. 5, a flow diagram of a method 500 of generating an action strategy. Method 500 includes a step 505 of receiving, using at least a processor, composition data from a user. In some embodiments, the composition data may include document data. Method 500 includes a step 510 of classifying the composition data, using the at least a processor, to one or more composition groups. In some embodiments, the composition data may be classified to the one or more composition groups using a group classifier, wherein the group classifier may be configured to receive group training data, wherein the group training data may include the composition data, and correlate the group training data to the one or more composition groups. In some embodiments, method 500 includes a step 515 of providing, using the at least a processor, a composition course as a function of the one or more composition groups. In some embodiments, the composition course may include an assessment Method 500 includes a step 520 of determining, using the at least a processor, an action item as a function of the one or more composition groups. In some embodiments, determining the action item may include receiving an item response from the user. In some embodiments, the item response may include a course response. In some embodiments, determining the action item may include determining an item status of the action item as a function of the item response using a status machine-learning model. In some embodiments, the item status may include a course status, wherein the course status may include a completion status of the composition course. In some embodiments, determining the action item may further include generating, using an action machine-learning model, a first action item, wherein the action machine-learning model may be configured to correlate action training data to the action item, receiving, using the at least a processor, the course response from the user for the first action item, determining, using the status machine-learning model, the completion status of the composition course, and identifying, using the action machine-learning model, a second action item as a function of the completion status of the composition course. Method 500 includes a step 525 of generating, using the at least a processor, an action strategy as a function of the action item. In some embodiments, the at least a processor may further configured to generate a report using a graph machine-learning model, wherein the report may include a graphically represented item of the composition data and generating the report using the graph machine-learning model may further include receiving a graph training data, wherein the graph training data may include the composition data, and creating the report as a function of the graph training data set, where in the report may include the graphically represented item of the composition data. This may be implemented as disclosed with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
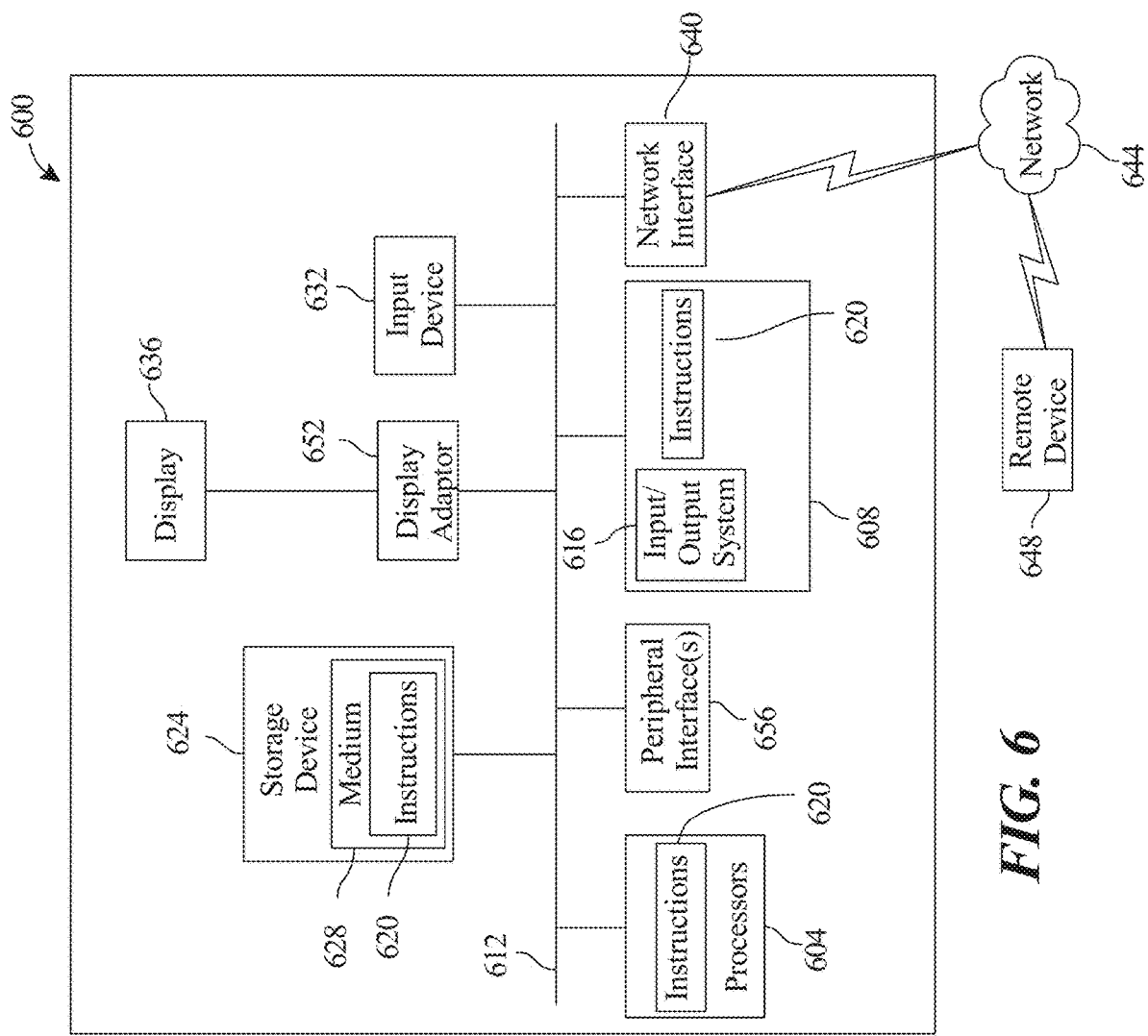
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve a system and a method according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for generating an action strategy, wherein the system comprises:
    at least a processor; and
    a memory communicatively connected to the processor, the memory containing instructions configuring the at least a processor to:

receive composition data from a user, wherein the composition data comprises:
  at least a plurality of pecuniary goals; and
  at least a non-goal group comprising data not related to the at least a plurality of pecuniary goals;
train a group classifier using group training data, and wherein training the group classifier further comprises:
  correlating the at least a plurality of pecuniary goals of the composition data one or more composition groups;
  updating the group training data with a previous correlation of the at least a plurality of pecuniary goals of the composition data to the one or more composition groups; and
  retraining the group classifier as a function of the updated group training data, wherein the group classifier is further configured to classify composition data into the one or more composition groups as a function of the at least a plurality of pecuniary goals;
classify the composition data to one or more composition groups using the group classifier;
receive input on the one or more composition groups from an advisor comprising a professional related to a specific composition group;
provide a composition course as a function of the one or more composition groups, wherein providing the composition course comprises training a course machine-learning model on a course training dataset comprising a correlation between at least one example composition group and at least one example composition course, wherein the course machine-learning model comprises at least an artificial neural network comprising an input layer of nodes, one or more intermediate layers of nodes, and an output layer of nodes adjusting one or more connections and one or more weights between nodes in adjacent layers of the course machine-learning model;
receiving additional course training data from the advisor; and
retraining the course machine-learning model as a function of the course training dataset;
determine an action item as a function of the one or more composition groups wherein determining an action item further comprises generating at least an advisor action related to a review with the advisor; and
generate an action strategy comprising at least a tax strategy as a function of the action item comprising a plurality of steps for the action strategy as a function of a focus level, wherein the focus level comprises a user goal, of the one or more composition groups.

2. The system of claim 1, wherein the composition data comprises document data.

3. The system of claim 1, wherein the composition course comprises an assessment.

4. The system of claim 1, wherein determining the action item comprises receiving an item response from the user.

5. The system of claim 4, wherein the item response comprises a course response.

6. The system of claim 5, wherein determining the action item comprises determining an item status of the action item as a function of the item response using a status machine-learning model.

7. The system of claim 6, wherein the item status comprises a course status, wherein the course status comprises a completion status of the composition course.

8. The system of claim 7, wherein determining the action item further comprises:
  generating, using an action machine-learning model, a first action item, wherein the action machine-learning model is configured to correlate action training data to the action item;
  receiving, using the at least a processor, the course response from the user for the first action item;
  determining, using the status machine-learning model, the completion status of the composition course; and
  identifying, using the action machine-learning model, a second action item as a function of the completion status of the composition course.

9. The system of claim 1, wherein the at least a processor is further configured to generate a report using a graph machine-learning model, wherein the report comprises a graphically represented item of the composition data and generating the report using the graph machine-learning model further comprises:
  receiving a graph training data, wherein the graph training data comprises the composition data; and
  creating the report as a function of the graph training data, where in the report comprises the graphically represented item of the composition data.

10. A method for generating an action strategy, wherein the method comprises:
  receiving, using at least a processor, composition data from a user, wherein the composition data comprises:
    at least a plurality of pecuniary goals; and
    at least a non-goal group comprising data not related to the at least a plurality of pecuniary goals;
  training, using the at least a processor, a group classifier using a group classifier, wherein the group training data further comprises:
    correlating the at least a plurality of pecuniary goals of the composition data to one or more composition groups;
    updating the group training data with a previous correlation of the at least a plurality of pecuniary goals of the composition data to the one or more composition groups; and
    retraining the group classifier as a function of an updated group training data, wherein the group classifier is further configured to classify composition data into one or more composition groups as a function of the at least a plurality of pecuniary goals;
  classifying, using the at least a processor, the composition data to one or more composition groups using the group classifier;
  receiving input on the one or more composition groups from an advisor comprising a professional related to a specific composition group;
  providing, using the at least a processor, a composition course as a function of the one or more composition groups, wherein providing the composition course comprises training a course machine-learning model on a course training dataset comprising a correlation between at least one example composition group and at least one example composition course, wherein the course machine-learning model comprises at least an artificial neural network comprising an input layer of nodes, one or more intermediate layers of nodes, and an output layer of nodes, adjusting one or more connections and one or more weights between nodes in adjacent layers of the course machine-learning model;

receiving additional course training data from the advisor; and retraining the course machine-learning model as a function of the course training dataset;

determining, using the at least a processor, an action item as a function of the one or more composition groups wherein determining an action item further comprises generating at least an advisor action related to a review with the advisor; and generating, using the at least a processor, an action strategy comprising at least a tax strategy as a function of the action item comprising a plurality of steps for the action strategy as a function of a focus level, wherein the focus level comprises a user goal, of the one or more composition groups.

11. The method of claim 10, wherein the composition data comprises document data.

12. The method of claim 10, wherein the composition course comprises an assessment.

13. The method of claim 10, wherein determining the action item comprises receiving an item response from the user.

14. The method of claim 13, wherein the item response comprises a course response.

15. The method of claim 14, wherein determining the action item comprises determining an item status of the action item as a function of the item response using a status machine-learning model.

16. The method of claim 15, wherein the item status comprises a course status, wherein the course status comprises a completion status of the composition course.

17. The method of claim 16, wherein determining the action item further comprises:

generating, using an action machine-learning model, a first action item, wherein the action machine-learning model is configured to correlate action training data to the action item;

receiving, using the at least a processor, the course response from the user for the first action item;

determining, using the status machine-learning model, the completion status of the composition course; and identifying, using the action machine-learning model, a second action item as a function of the completion status of the composition course.

18. The method of claim 10, further comprising:

generating, using the at least a processor, a report using a graph machine-learning model, wherein the report comprises a graphically represented item of the composition data and generating the report using the graph machine-learning model further comprises:

receiving a graph training data, wherein the graph training data comprises the composition data; and creating the report as a function of the graph training data, where in the report comprises the graphically represented item of the composition data.

* * * * *